(12) United States Patent
Vachon

(10) Patent No.: US 11,047,094 B2
(45) Date of Patent: Jun. 29, 2021

(54) PADDING LAYER WITH DRAINAGE FOR SPORTS PLAYING FIELD

(71) Applicant: 4427017 Canada Inc., Laval (CA)

(72) Inventor: Frederic Vachon, Laval (CA)

(73) Assignee: 4427017 CANADA INC., Laval (CA)

(*) Notice: Subject to any disclaimer, the term of this patent is extended or adjusted under 35 U.S.C. 154(b) by 0 days.

(21) Appl. No.: 16/704,099

(22) Filed: Dec. 5, 2019

(65) Prior Publication Data
US 2020/0181855 A1 Jun. 11, 2020

Related U.S. Application Data

(60) Provisional application No. 62/776,700, filed on Dec. 7, 2018.

(51) Int. Cl.
*E01C 13/08* (2006.01)
*B32B 5/06* (2006.01)

(52) U.S. Cl.
CPC .............. *E01C 13/083* (2013.01); *B32B 5/06* (2013.01); *B32B 2262/0261* (2013.01); *B32B 2262/0276* (2013.01); *B32B 2307/726* (2013.01); *B32B 2471/00* (2013.01)

(58) Field of Classification Search
CPC combination set(s) only.
See application file for complete search history.

(56) References Cited

U.S. PATENT DOCUMENTS

| 3,900,656 | A | * | 8/1975 | Schmidt | E01C 13/08 428/215 |
| 4,497,853 | A | * | 2/1985 | Tomarin | A63C 19/04 428/17 |
| 4,735,825 | A | * | 4/1988 | Friedrich | E01C 13/08 427/202 |
| 6,858,272 | B2 | | 2/2005 | Squires | |
| 7,166,340 | B1 | * | 1/2007 | Clark | A41G 1/009 428/17 |
| 7,273,642 | B2 | | 9/2007 | Prévost | |
| 9,771,692 | B2 | | 9/2017 | Sawyer et al. | |
| 2002/0132099 | A1 | | 9/2002 | Squires | |

(Continued)

FOREIGN PATENT DOCUMENTS

| WO | 2004109017 | 12/2004 |
| WO | 2019014324 | 1/2019 |
| WO | 2019133789 | 7/2019 |

OTHER PUBLICATIONS

Enkadrain, Geocomposite de Drainage Antivibratile, Enka Solutions, URL: https://enka-solutions.com/en/products/composites/enkadrain/.

*Primary Examiner* — Kyle Armstrong
(74) *Attorney, Agent, or Firm* — C. Marc Benoit

(57) ABSTRACT

There is described a panel assembly to be laid over a base surface and under a carpet-like top layer to install a multi-layered sports-playing field. The padding assembly comprises a panel comprising a top face and a bottom face, with the top face of the panel facing the carpet-like top layer and the panel further comprising drainage holes fluidly connecting the top face to the bottom face. The padding assembly also comprises a drain mat affixed to the bottom face of the panel with the drain mat operating as a fluid-permeable layer distancing the bottom face from the base surface. A method of installing a multi-layered sports-playing field is also described.

19 Claims, 11 Drawing Sheets

(56) References Cited

U.S. PATENT DOCUMENTS

| | | |
|---|---|---|
| 2004/0091326 A1 | 5/2004 | Spittle |
| 2005/0020157 A1 | 1/2005 | Weiser et al. |
| 2009/0162579 A1* | 6/2009 | McDuff ................ E01C 13/08 428/17 |
| 2009/0208674 A1* | 8/2009 | Murphy ................ A01G 9/033 428/17 |
| 2013/0101805 A1 | 4/2013 | Altshuler et al. |
| 2013/0102403 A1* | 4/2013 | Vachon ................ A63C 19/04 472/92 |
| 2016/0319493 A1 | 11/2016 | Verleyen et al. |
| 2019/0301107 A1 | 10/2019 | Aldahir et al. |

* cited by examiner

PADDING LAYER WITH DRAINAGE FOR SPORTS PLAYING FIELD

CROSS-REFERENCE TO RELATED APPLICATION

This application claims priority from U.S. provisional patent application 62/776,700 filed Dec. 7, 2018, the specification of which is hereby incorporated herein by reference in its entirety.

BACKGROUND

(a) Field

The subject matter disclosed generally relates to playing fields and more particularly to artificial sports playing fields. More particularly, the subject matter disclosed relates to panel assemblies for laying thereon artificial turfs of sports playing fields.

(b) Related Prior Art

Present day sports playing fields are often made of a mix of natural and synthetic/artificial material. A base layer of dirt, gravel, sand or other suitable material is sometimes provided. An artificial padding layer may then be installed on top of which a layer of artificial grass is laid. The artificial grass construction is very similar to most types of industrially-made carpets and can be filled or not with material like SBR, EPDM, TPE, coated sand, sand or other infill material.

The design consideration for sports playing fields include: athlete's safety, surface hardness, water drainage, heat management, ease of assembly/installation, durability/longevity, uniformity, resistance to change in weather according to seasons, stability, etc.

The playing field described herein was developed keeping all such factors in mind.

One particular challenge of such artificial playing fields relates to water drainage. Over the last decades, numerous patent applications have been filed that provide options to handle the water drainage challenge. For example, U.S. Pat. No. 9,771,692 B2 issued to Brock USA teaches to use an underlayment layer with a variety of projections for handling the flow of water for drainage. Another example is PCT Patent Application WO 2004/109017 A2 from Prevost that teaches a unit for a modular synthetic grass turf assembly.

SUMMARY

According to an embodiment, there is provided a panel assembly to be laid over a base surface and under a carpet-like top layer, the panel assembly comprising: a panel comprising a top face and a bottom face, the top face of the panel facing the carpet-like top layer, the panel further comprising drainage holes fluidly connecting the top face to the bottom face; and a drain mat affixed to the bottom face of the panel, the drain mat operating as a fluid-permeable layer distancing the bottom face from the base surface.

According to an aspect, the drain mat comprises one or more fibers defining an interminglement of fibers.

According to an aspect, the interminglement of fibers comprises, for any reference plane passing through the drain mat, a plurality of randomly oriented discrete fibers defining a plurality of non-hollow projections extending from the any reference plane.

According to an aspect, the intermingled fibers are made of one of Polyamide, Nylon, Polypropylene, polyethylene, Polyestere, or PVC.

According to an aspect, the top face of the panel comprises a top surface and a crown located above the top surface.

According to an aspect, the panel comprises top channels connected to the drainage holes.

According to an aspect, the panel has a thickness of between 0.25 and 6 inches.

According to an aspect, the panel is exclusively or partially made of one of Expanded Polypropylene (EPP) and of a Hybrid EPP (HEPP), wherein the HEPP comprises a mix of an EPP with at least one of an expanded Polyethylene (EPE), a Polyethylene (PE), a rubber material, a recyclable material in order to maximize hardness-flexibility ratio of the panel.

According to an aspect, the panel consists of a closed-cell structure made with closed-cell beads.

According to an aspect, the closed-cell beads are expanded closed-cell beads.

According to an aspect, the drain mat is affixed to the bottom face of the panel using one of a mechanical method, a chemical method and a thermal method.

According to an aspect, the drain mat has a thickness that distances the bottom face from the base surface when installed thereon, and wherein the thickness of the drain mat decreases to a minimum thickness when undergoing pressure, with the drain mat remaining water-permeable at the minimum thickness.

According to an aspect, the drain mat comprises a combination of a top layer and a bottom layer attached to each other and providing a spacing between the bottom face and the base surface, wherein the top layer has a substantially rippled shape while the bottom layer has a substantially flat shape and both the top layer and bottom layer are water-permeable.

According to an aspect, the panel and the drain mat are made of different materials in that the different materials have at least different mechanical characteristics.

According to an aspect, the panel and the drain mat form a single unit for installation over the base surface.

According to an aspect, the top face of the panel receives the carpet-like top layer directly without any other intermediary layer.

According to an aspect, the panel is made of a water-impervious material.

According to an embodiment, there is provided an underlayment to be laid over a base surface and under a carpet-like top layer, the underlayment comprising: a panel assembly comprising panels comprising edges and assembled together through their edges, wherein each one of the panels further comprises a top face and a bottom face with the top face of the panel facing the carpet-like top layer; a drain mat to be installed over the base surface and on which are laid the bottom faces of the panels, with the drain mat operating as a fluid-permeable layer distancing the bottom face of the panels from the base surface, wherein the panel assembly comprises drainage holes fluidly connecting the top face of the panel assembly to the bottom face of the panel assembly.

According to an aspect, the edges of the panels comprise an interlocking component interfacing with the interlocking component of another one of the panels for assembly.

According to an aspect, the underlayment further comprises draining spaces located where panels interface with each other, with the drain mat allowing fluid to flow under the panel assembly from the draining spaces.

According to an embodiment, there is provided a method of installing a multi-layered sports-playing field over a base surface comprising: laying down an underlayment over the base surface, comprising a drain mat operating as a fluid-permeable layer; and a panel assembly comprising panels comprising a top face, a bottom face, and drainage holes connecting the top face to the bottom face and allowing fluid to flow from the top face to the bottom face of the panel assembly, wherein the drain mat distances the bottom face from the base surface; and laying down a carpet-like top layer over the underlayment.

According to an aspect, the drain mat is affixed to the panels prior to the step of laying down the underlayment, and wherein the step of laying down the underlayment comprises assembling the panels into the panel assembly.

According to an aspect, the step of laying down the underlayment comprises: laying down the drain mat over a first portion of the base surface, and laying down and assembling two of the panels over the drain mat.

According to an embodiment, there is provided a panel assembly to be laid over a base surface and under a carpet-like top layer, the panel assembly comprising: a panel comprising a top face and a bottom face, the top face of the panel facing the carpet-like top layer, wherein the panel consists of a closed-cell structure made with closed-cell beads; and a drain mat affixed to the bottom face of the panel, wherein the drain mat operates as a fluid-permeable layer and maintains a distance adapted for fluid circulation between the bottom face and the base surface.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

The realizations will now be described more fully hereinafter with reference to the accompanying figures, in which realizations are illustrated. The foregoing may, however, be embodied in many different forms and should not be construed as limited to the illustrated realizations set forth herein.

With respect to the present description, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values and of values herein or on the drawings are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described realizations. The use of any and all examples, or exemplary language ("e.g.," "such as," or the like) provided herein, is intended merely to better illuminate the exemplary realizations and does not pose a limitation on the scope of the realizations. No language in the specification should be construed as indicating any unclaimed element as essential to the practice of the realizations.

In the following description, it is understood that terms such as "first", "second", "top", "bottom", "above", "below", and the like, are words of convenience and are not to be construed as limiting terms. The terms "top", "bottom", "vertical", "horizontal" and the like are intended to be construed in their normal meaning in relation with an assembly comprising the present product, thus in relation with normal installation of the product in an artificial sports-playing field.

Figure 13:
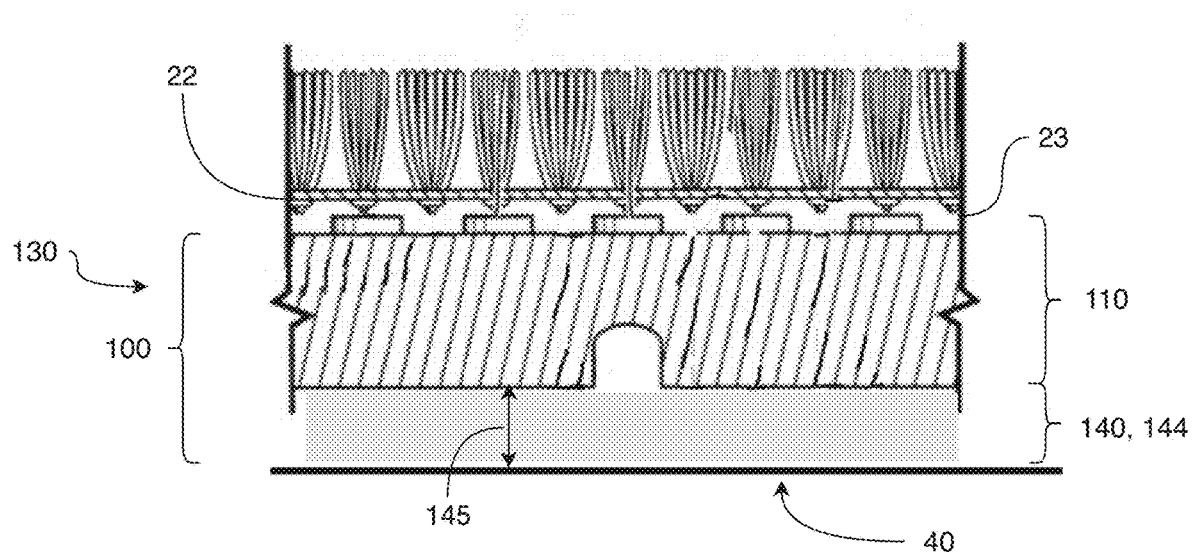
FIG. 13 is a partial cutout elevation view illustrating the panel assembly according to a realization of the present disclosure on which is laid a top layer made of substantially artificial material simulating a natural playing surface such as grass and installed over a base surface.
Figure 14:
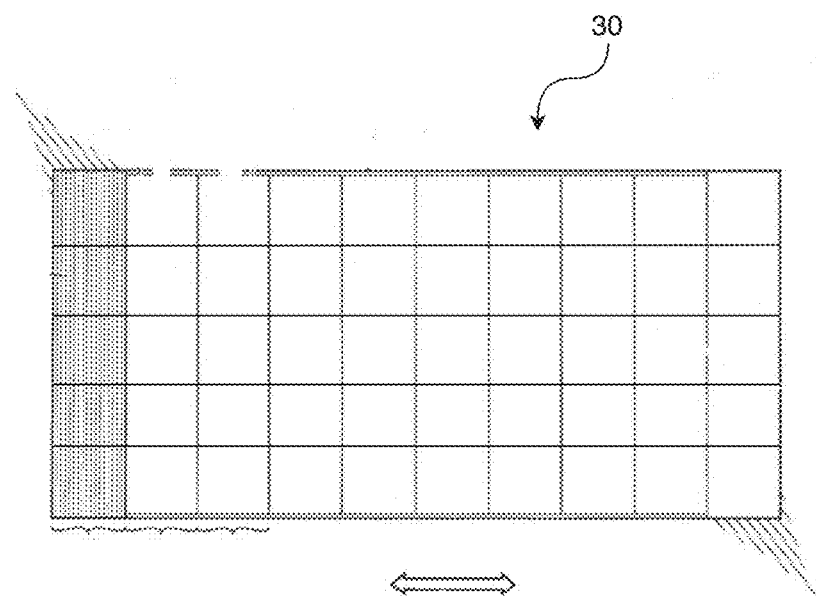
FIG. 14 is a schematic top view of a playing field view built with any one of the panel assemblies described in relation with FIGS. 1 to 8.

Referring now to the drawings, and more particularly to FIGS. 1 to 3, 13 and 14, a realization of a panel assembly 100 is shown. The panel assembly 100 is adapted for a multi-layered sports-playing field 30 (FIG. 14). The panel assembly 100 is for installation under a carpet-like top layer 22 (FIG. 13) and over a base surface 40 (FIG. 13). Such a base surface 40 may be anyone a natural ground, a base layer of dirt, of gravel, of sand or other suitable material. Other base surfaces may also comprise manufactured base surfaces such as concrete surfaces and flooring surfaces.

Referring particularly to FIG. 13, the carpet-like top layer 22 typically consists of an artificial turf carpet as described, for example, in Patent Application US 2016/02655170 A1 from the Applicant and herein integrated by reference. The top layer 22 may be installed directly over the panel assembly 100 as will be discussed below or with one or more intermediary layers in-between.

According to a realization, the top layer 22 comprises a series of regularly spaced apart (or equally spaced) parallel rows of backstitches 23 separated by a backstitch distance, with the panel assembly 100 adapted for the installation of the top layer 22 thereover.

Figure 1:
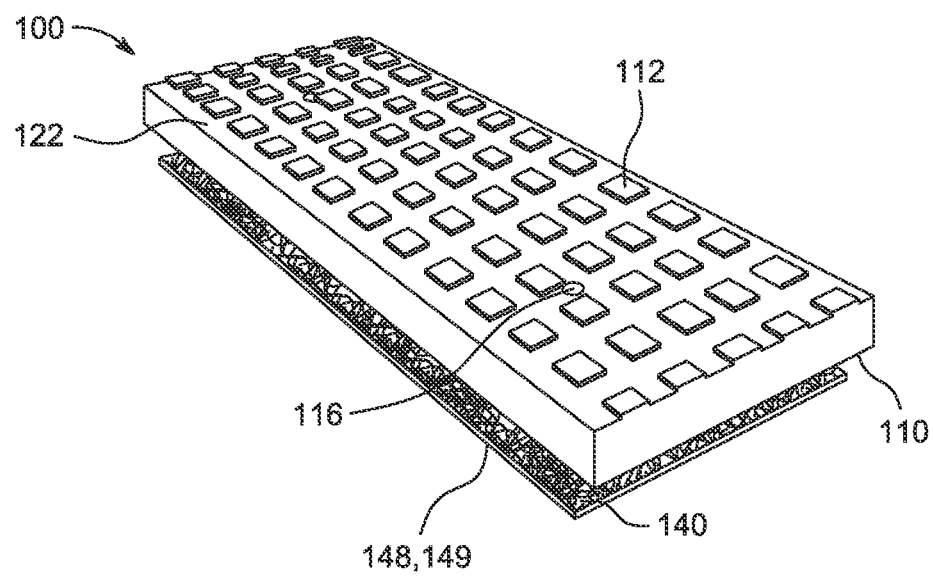
FIG. 1 is a top perspective view of a panel assembly according to a realization of the present disclosure.
Figure 2:
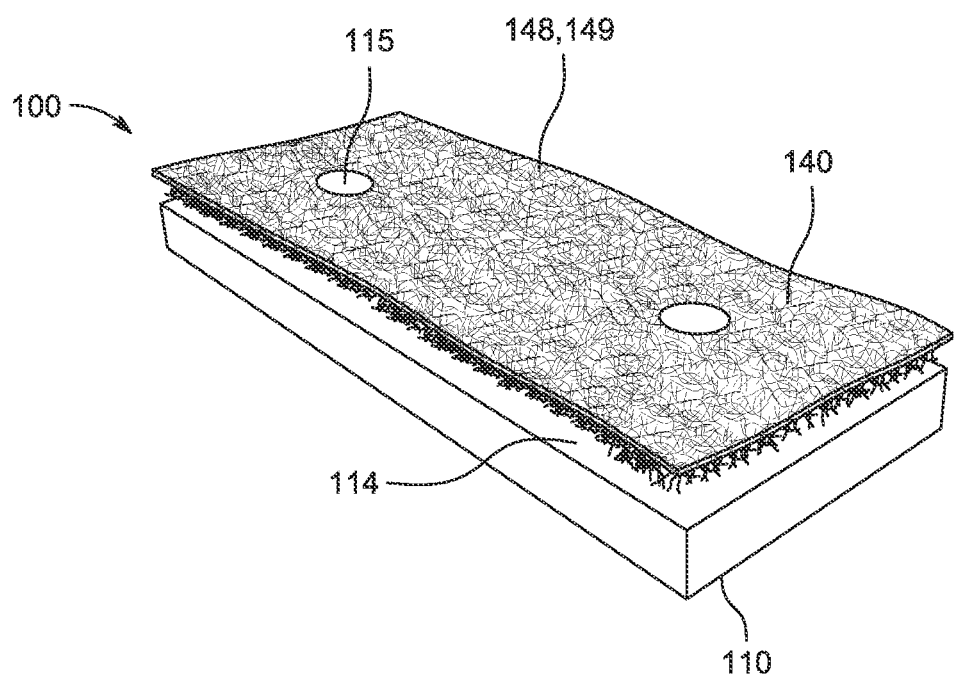
FIG. 2 is a bottom perspective view of the panel assembly of FIG. 1.
Figure 3:
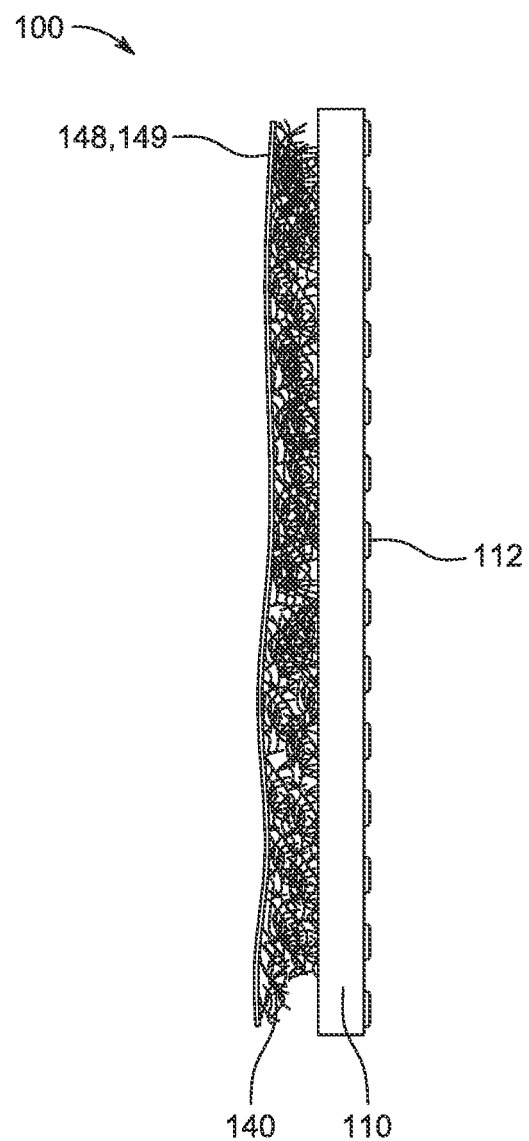
FIG. 3 is a side view of a panel assembly of FIGS. 1 and 2.

Referring particularly to FIGS. 1 to 3, the panel assembly 100 comprises a panel 110 comprising a top face 112 and a bottom face 114. The top face 112 of the panel 110 is adapted to receive the carpet-like top layer 22 once installed as an artificial-sports playing field 30. The panel 110 comprises drainage holes 116 connecting the top face 112 to the bottom face 114. The drainage holes 116 provides paths for fluid, typically water, to travel from the top face 112 of the panel 110 to its bottom face 114 and thus preventing undesired accumulation of liquid about the top layer 22. In other embodiments, the panel 110 does not comprise drainage holes.

According to a realization, the top face 112 comprises top channels 122 separated by a channel distance. The channel distance is the distance between centers of two adjacent top channels 122. According to a realization, the channel width and distance separating adjacent top channels 122 are selected based on the backstitch distance separating adjacent rows of backstitches 23 for the same number of rows of backstitches 23 falling in each of the top channels 122.

Figure 9:
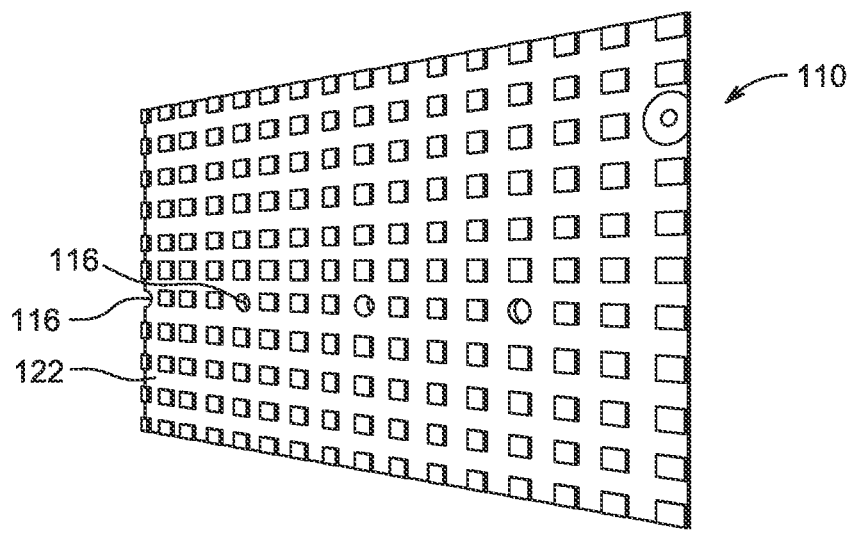
FIG. 9 is a top perspective view of a panel compatible with the realizations of FIGS. 1 to 8.
Figure 10:
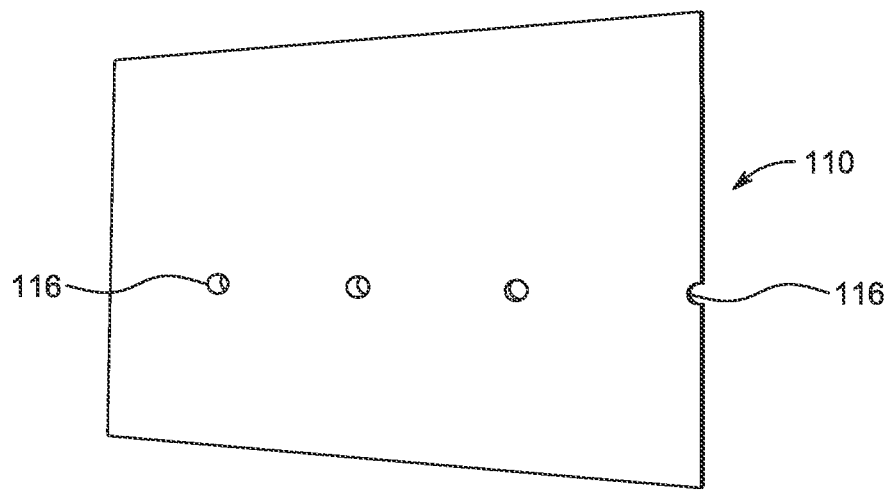
FIG. 10 is a bottom perspective view of the panel of FIG. 9.
Figure 11:
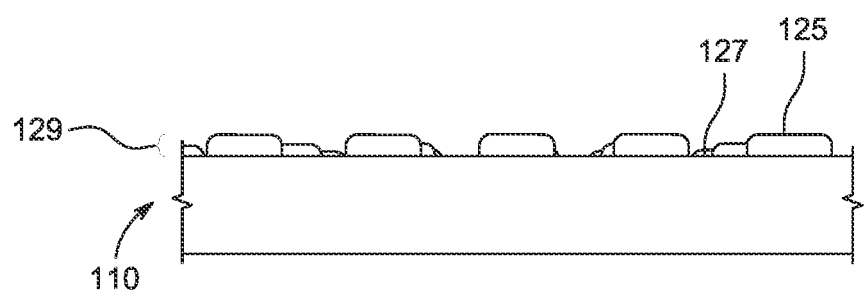
FIG. 11 is a side view of a panel of FIGS. 9 and 10.
Figure 12:
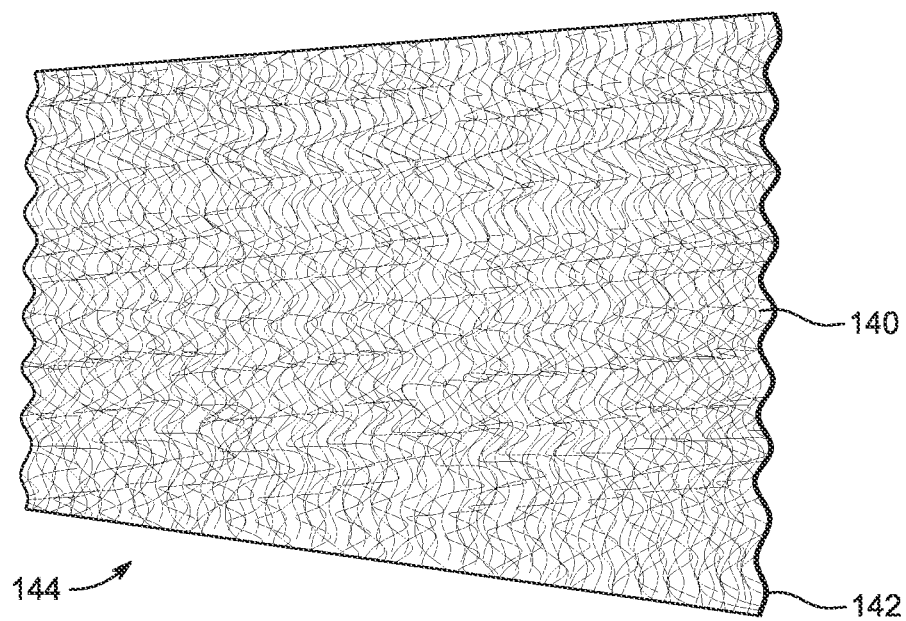
FIG. 12 is a top perspective view of a drain mat according to a realization of the present disclosure.

Referring additionally to FIGS. 9 to 11, the top channels 122 further define a top crown 125 and a top surface 127, with the drainage holes 116 being connected to the top surface 127. The distance between the top surface 127 and the top crown 125 (i.e., a top-face irregularity 129) and the width of the top channels 122 are selected for a maximum flow of fluid to be drained. These dimensions being related to the size(s) and number of drainage holes 116 per surface unit.

Typically, the panel 110 has a thickness (measured from the top crown 125) that is normally uniform and may range between one fourth (0.25) of an inch and six (6) inches. The panel 110 is typically made of material that may comprise exclusively or a mix of Expanded Polypropylene (EPP). According to a realization, the panel 110 is made of Hybrid EPP (HEPP), which is a mix of an EPP with an expanded Polyethylene (EPE), a Polyethylene (PE), a rubber material, a recyclable material or another suitable material to maximize the hardness-flexibility ratio. According to a realization, the panel 110 consists of a closed-cell structure made with closed-cell beads. According to a realization, the closed-cell beads and expanded closed-cell beads. According to a realization, the material of the panel 110 defines a water-impervious surface preventing fluid to flow from the top face 112 to the bottom face 114 through the material.

According to a realization (not shown), the bottom face 114 may comprise bottom channels (similar to top channels 122) extending over the bottom face 114. Accordingly, the bottom face 114 of the panel 110 comprises, as looked at top side down, bottom-face irregularity comparable in nature to top-face irregularity 129.

According to realizations, the bottom-face irregularity may vary from null to equal to the top-face irregularity 129. According to a typical realization, the bottom-face irregularity is smaller than the top-face irregularity 129.

According to a realization, the bottom-face irregularity results from the presence of bottom channels. According to another realization, the bottom-face irregularity results from an uneven bottom face 114, the bottom face 114 comprising bumps (not shown) or other sources of unevenness randomly spread over the bottom face 114.

According to a realization, the drainage holes 116 comprise a top opening area 131 about the top face 112 and a bottom opening area 133 about the bottom face 114, wherein the bottom opening area 133 is greater in size than an opening area measured at another elevation according to the thickness orientation of the panel 110. The variation in size of the opening are increases the surface of the drain mat 140 receiving fluid flowing though the drainage holes 116 per unit of fluid drained and thus the surface of exchange of fluid between the bottom face 114 and the base surface 40. According to a realization, the smallest opening area of a drainage hole 116 is located in-between the top face 112 and the bottom face 114. Thus, the drainage holes 116 take the shape of two funnels connected by their smallest openings located somewhere between the top face 112 and the bottom face 114. According to an embodiment, the panel 110 and the drain mat 140 are made of different materials in that the different materials have at least different mechanical characteristics.

Referring particularly to FIGS. 1 to 5 and 12, to the bottom face 114 of the panel 110 is affixed a drain mat 140, with the bottom face 148 of the drain mat 140 being laid in contact with the base surface 40 for the installation of the artificial sports playing field 30 over the base surface 40.

According to realizations, the drain mat 140 is affixed to the bottom face 114 of the panel 110 using one of mechanical methods, chemical methods and thermal methods, or a combination of methods thereof. Examples of mechanical methods comprise rivets (e.g., plastic rivets 115), screws, clamps, staples, stitching, and pressure. Examples of chemical methods comprise bonding glue, adhesives overlaying a to-be-affixed portion of the drain mat 140, etc. Examples of thermal methods comprise heat bonding accompanied or not with pressure in order to fuse a portion of the drain mat 140 with the bottom face 114.

According to a realization, the drain mat 140 comprises intermingled fibers 142 forming a fluid permeable layer 144. The intermingled fibers 142 of the drain mat 140 globally have a chaotic, chaotic-like of a regular path resulting in sections of fibers 142 having vertical paths, horizontal paths, and a mix thereof. The assembled intermingled fibers 142 define a permeable layer 144 covering the bottom face 114 and having a thickness 145 that distances the bottom face 114 from the base surface 40 when installed. According to a realization, the intermingled fibers 142 are made of one of Polyamide, Nylon, Polypropylene, polyethylene, Polyestere, PVC. According to a realization, the thickness 145 of the drain mat 140 when no pressure is applied over it is between about between 4 mm to 15 mm, and is about between 3 mm to 10 mm when a pressure of 7 to 10 pounds per square is applied thereon. Therefore, the drain mat has a thickness that distances the bottom face from the base surface when installed thereon, and wherein the thickness of the drain mat decreases to a minimum thickness when undergoing pressure, with the drain mat remaining water-permeable at the minimum thickness The interminglement of fibers may be seen or conceptualized as comprising, for any reference plane passing through the drain mat, a plurality of randomly oriented discrete fibers defining a plurality of non-hollow projections extending from the reference plane. For example, a reference 149 may be a plane parallel to the bottom face 114 and at a random distance from the bottom face 114. For another example, a reference may be a plane perpendicular to the bottom face 114. For another example, a reference may be a plane crossing both the bottom face 114 and the fluid permeable layer 144 at a non-perpendicular angle, thus sloped relative to the general orientation of the panel assembly 100.

Figure 4:
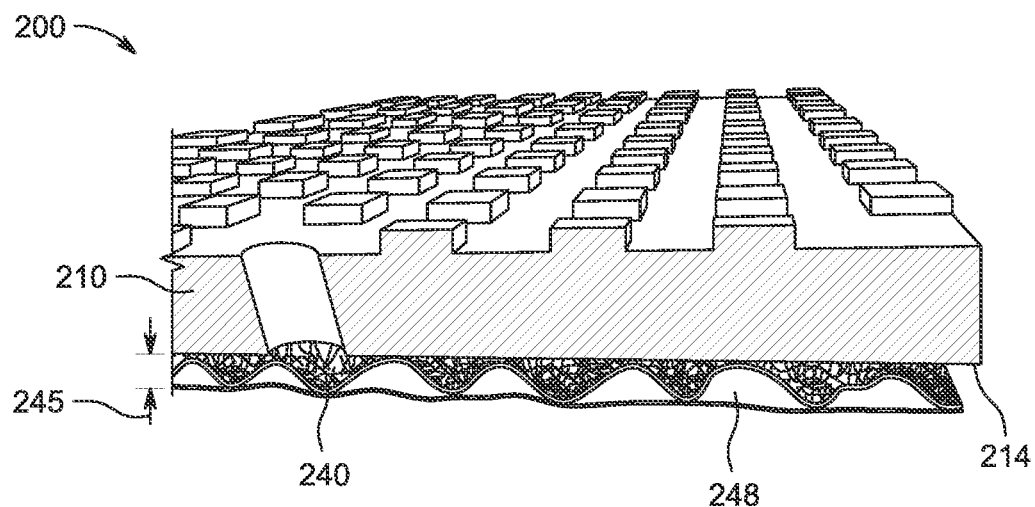
FIG. 4 is a side perspective view a panel assembly according to another realization of the present disclosure.
Figure 5:
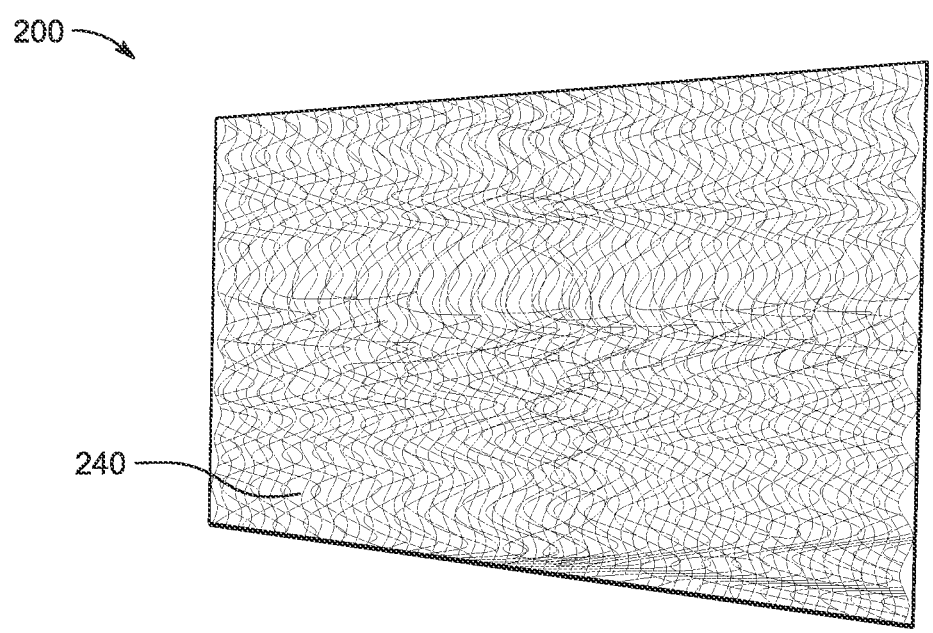
FIG. 5 is a bottom perspective view of the panel assembly of FIG. 4.

Now referring to FIGS. 4 and 5, another realization of a panel assembly 200 comprises a drain mat 240 having a rigid core 210, and comprising a combination of layers 246 and 248 having a thickness 245 that provides a spacing between the bottom face 214 and the base surface 40 (see FIG. 13). In one realization, the top layer 246 and the bottom layer 248 are attached to each other and the top layer 246 has a substantially rippled shape while the bottom layer 248 has a substantially flat shape.

Figure 6:
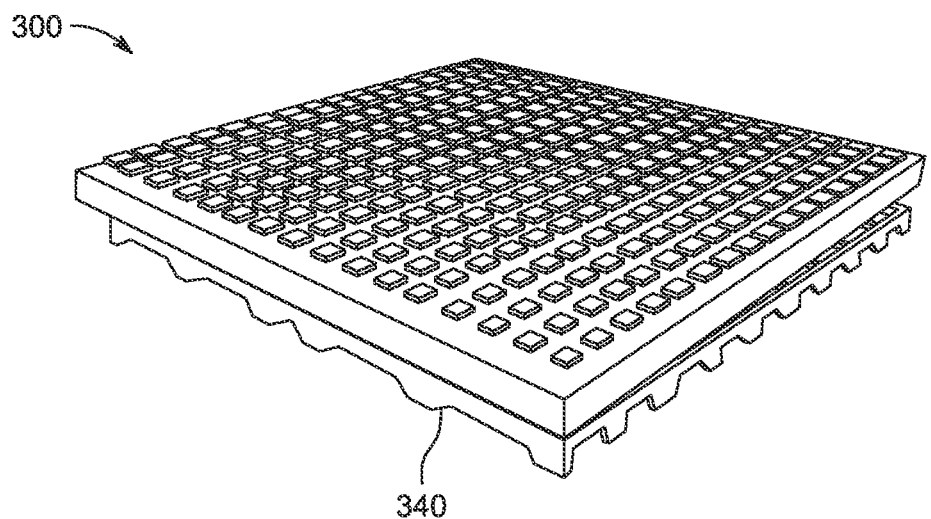
FIG. 6 is a top perspective view a panel assembly according to another realization of the present disclosure.
Figure 7:
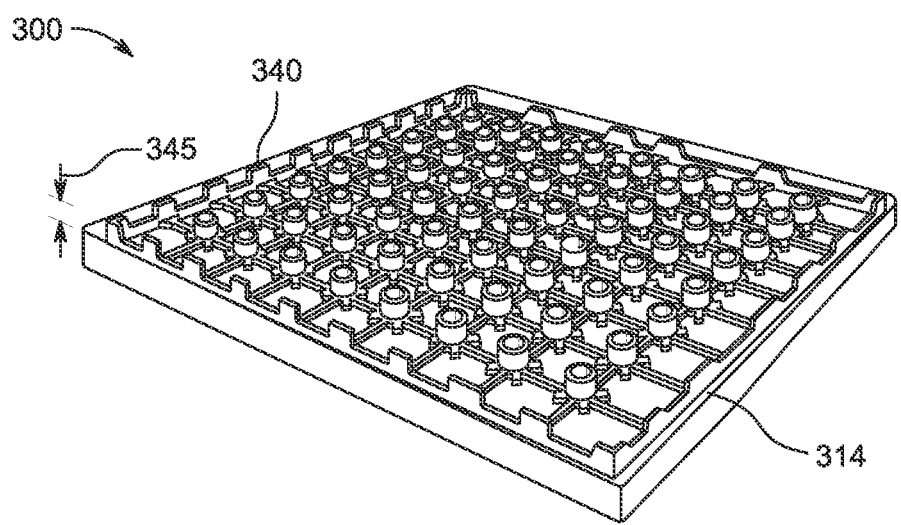
FIGS. 7 and 8 are bottom perspective views of the panel assembly of FIG. 6.
Figure 8:
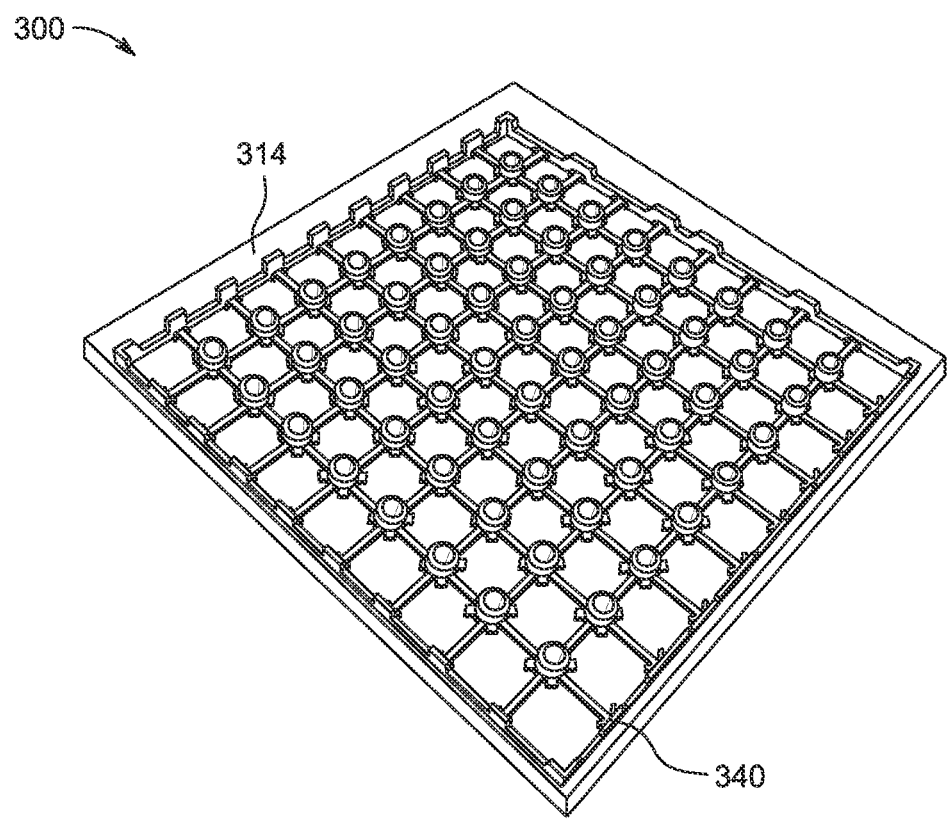

Now referring to FIGS. 6 to 8, another realization of a panel assembly 300 comprises a drain mat 340 made of unibody non-porous material, the drain mat 340 comprising open portions thereby defining a fluid-porous layer. The drain mat 340 further has a thickness 345 spacing the bottom face 314 from the base surface 40.

Now referring to FIGS. 13 and 14, a plurality of panel assemblies 100 are assembled together to form an underlayment 130 for a multi-layered artificial sports-playing field 30.

Figure 15:
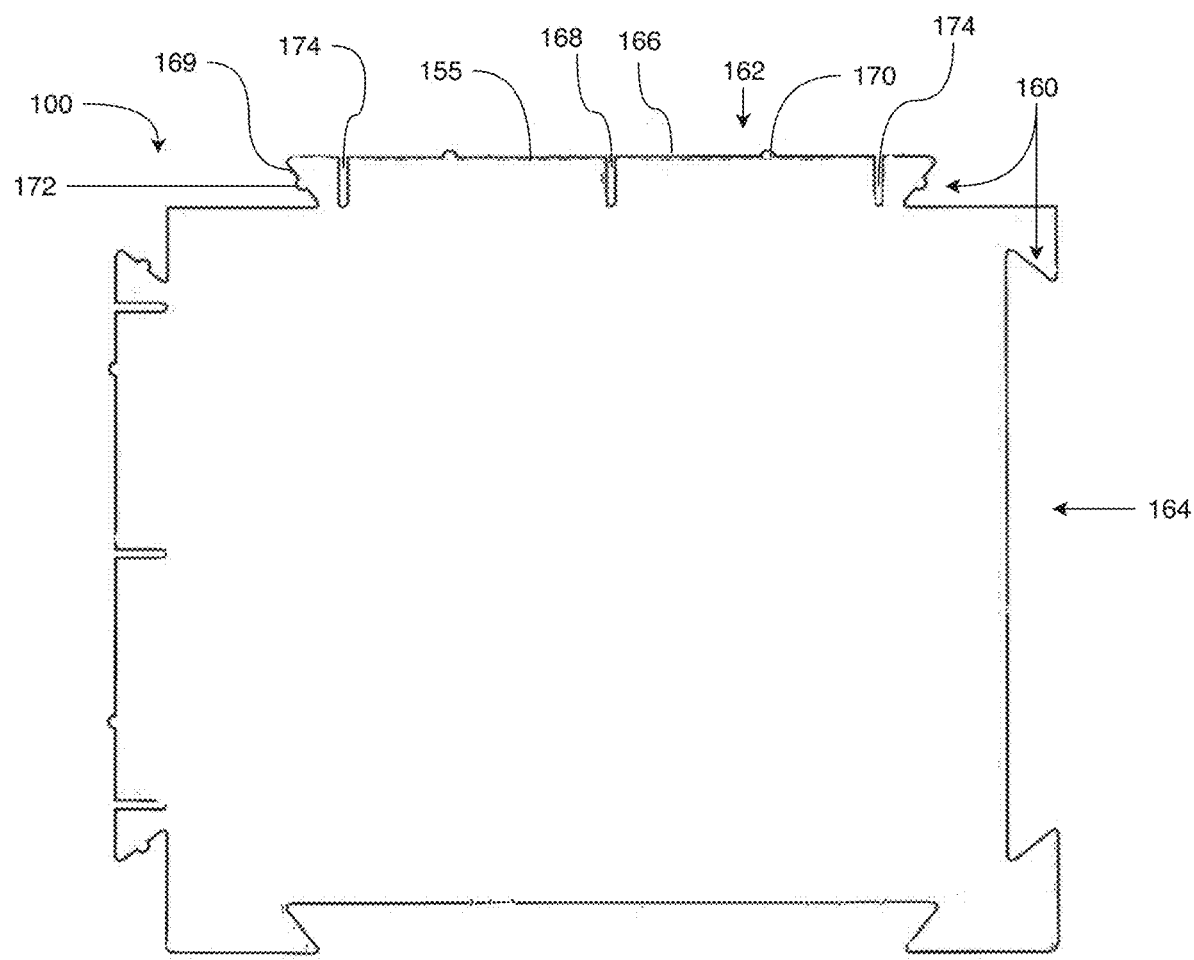
FIG. 15 is a top view of a panel assembly comprising interlocking components.
Figure 16:
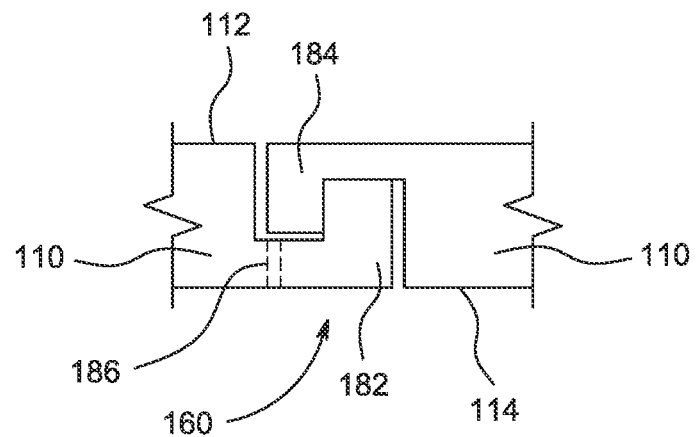
FIG. 16 is a partial cutout elevation view of interlocking components according to another realization.
Figure 17:
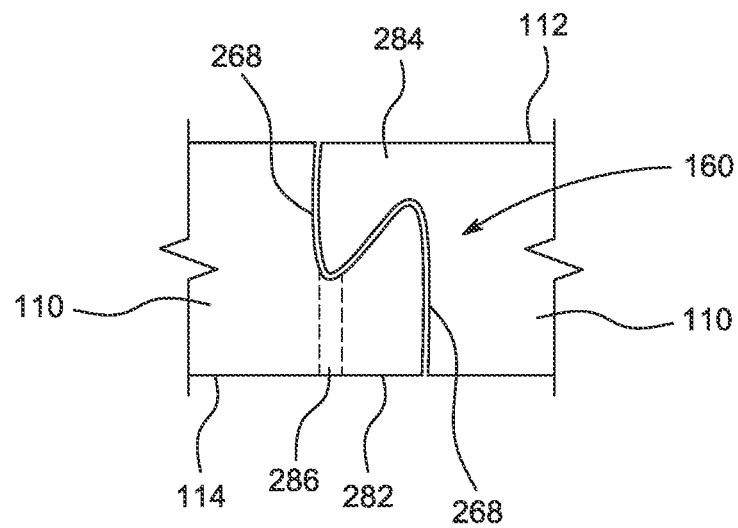
FIG. 17 is a partial cutout elevation view of interlocking components according to another realization.

Referring additionally to FIGS. 15 to 17, according to a realization, the panel assemblies 100 comprise on their edges 155 interlocking components 160 for assembly with a substantially identical panel assembly 100.

According to a realization, the interlocking components 160 comprise tab (male) 162 and blank (female) 164 portions. The tab portions 162 have a straight external edge 166 comprising a slit 168 to account for expansion of the at least one of the tab portions 162 occurring upon an increase in temperature of the panel assemblies 100. According to a realization, the width of the slit 168 is between five (5) mm and twenty-five (25) mm.

Still referring to FIG. 15. According to another realization, the panel assemblies 100 comprise interlocking tab (male) 162 and blank (female) 164 portions. The tab portions 162 has a straight external edge 166 and a protrusion 170 extending from the straight external edge 166 to ensure a minimal spacing between two adjacent panels assemblies 100. The protrusion 170 may thereby absorb the expansion of the panel assemblies 100. According to a realization, the protrusion 170 has a height and a width in a range of about one eighth (0.125) of an inch to one half (0.500) of an inch. According to another realization, the protrusion 170 has a height in a range of about one eighth (0.125) of an inch to one fourth (0.250) of an inch and a width in a range of about one fourth (0.250) of an inch to one half (0.500) of an inch.

Still referring to FIG. 15. According to another realization, the panel assemblies 100 comprise interlocking tab (male) 162 and blank (female) 164 portions. The tab portions 162 have a lateral edge 169 and a protrusion 172 extending from the lateral edge 169 to ensure a minimal spacing between two adjacent panel assemblies 100. The protrusion 172 thereby absorbing the contraction of the panel assemblies 100 occurring upon a decrease in temperature (cold weather). According to a realization, the protrusion 172 has a height in a range of one eighth (0.125) of an inch to one fourth (0.250) of an inch and a width in a range of one fourth (0.250) of an inch to one half (0.500) of an inch.

Still referring to FIG. 15. According to another realization the panel assemblies 100 comprise interlocking tab (male) 162 and blank (female) 164 portions. The tab portions 162 having a straight external edge 166 and a lateral edge 169. The straight external edge 166 comprises a slit 174 in an area near the lateral edge 169 to form a hinged portion capable of absorbing the contraction of the panel assemblies 100. According to a realization, the width of the slit 174 is between five (5) mm and twenty-five (25) mm.

Referring particularly to FIG. 16, according to a realization, the panel assemblies 100 comprise interlocking components 160 comprising interlocking fingers 182 and 184 comprising a portion extending horizontally from the edges and a portion extending vertically from the horizontal portion distant from the edges. The fingers 182 and 184 hook together when panel assemblies 100 are assembled together. The fingers 182 extending upwardly comprises drainage holes 186 on its horizontal lowest portion. The drainage holes 186 of the fingers 182 allows fluid to flow from the top face 112, following the outer surface of interlocking components 160 down to the bottom face 114. Protrusions (not shown) over the outer vertical faces of the finger 182 or edge of the contacting panel assembly 100 provide contact and clearance to respond to thermal expansion and contraction as to guarantee clearance for fluid flow following the edge down to the drainage hole 186. According to a realization, the protrusions set a clearance of about one eighth (0.125) of an inch between the vertical hooking faces of the finger 182 and their contacting edge for expansion and contraction that occur with temperature changes.

Referring particularly to FIG. 17, according to a realization the fingers 282 and 284 comprises a hooking surface at an acute angle, for instance forty-five (45) degrees from a plane perpendicular to the top face 112 or bottom face 114 and extending from about the edges 268. The finger 282 extending upwardly comprises drainage holes 286 on its lowest portion close to the edge 268. The drainage holes 286 of the fingers 182 allow fluid to flow from the top face 112, following the surface of interlocking components 160 down to the bottom face 114. Protrusions (not shown) over the outer vertical faces of the finger 282 or edge 268 of the contacting panel assembly 100 provide contact and clearance to respond to thermal expansion and contraction as to guarantee clearance for fluid flow down to the drainage hole 286. According to a realization, the protrusions set a clearance of about one eighth (0.125) of an inch between the vertical hooking faces of a finger 282 and its contacting edge 268 for expansion and contraction that occur with temperature changes.

According to a realization, the panel 110 is rigid with some flexibility. The panel 110 cannot be rolled onto itself. When the panel 110 is held by one side, bending is minimal to null.

According to a realization, a method of installing a multi-layered sports playing field 30 over a base surface 40 comprises laying down an underlayment 130 over the base surface 40, comprising (1) a drain mat 140 operating as a fluid-permeable layer and (2) a panel 110 comprising a top face 112, a bottom face 114, and drainage holes 116 fluidly connecting the top face 112 to the bottom face 114 and allowing fluid to flow from the top face 112 to the bottom face 114 of the panel 110, wherein the drain mat 140 distances the bottom face 114 from the base surface 40. The method further comprises laying down a carpet-like top layer 22 over the underlayment 130.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A panel assembly to be laid over a permeable base surface and under a carpet-like top layer, the panel assembly comprising: a panel comprising a top face and a bottom face, the top face of the panel facing the carpet-like top layer, the panel further comprising drainage holes fluidly connecting the top face to the bottom face; and a drain mat affixed to the bottom face of the panel, the drain mat operating as a fluid-permeable layer which, while in direct contact with the permeable base surface, distances the bottom face from the permeable base surface, whereby, when the panel assembly is laid over the permeable base surface, fluid drains from the top face of the panel through the drain mat and is evacuated in the permeable base surface; and wherein the drain mat comprises a combination of a top layer and a bottom layer attached to each other and providing a spacing between the bottom face and the base surface, wherein the top layer has a substantially rippled shape while the bottom layer has a substantially flat shape and both the top layer and bottom layer are water-permeable.

2. The panel assembly of claim 1, wherein the drain mat comprises one or more fibers defining an interminglement of fibers.

3. The panel assembly of claim 2, wherein the interminglement of fibers comprises, for any reference plane passing through the drain mat, a plurality of randomly oriented discrete fibers defining a plurality of non-hollow projections extending from the any reference plane.

4. The panel assembly of claim 1, wherein the panel is exclusively or partially made of one of Expanded Polypropylene (EPP) and of a Hybrid EPP (HEPP), wherein the HEPP comprises a mix of an EPP with at least one of an expanded Polyethylene (EPE), a Polyethylene (PE), a rubber material, a recyclable material in order to maximize hardness-flexibility ratio of the panel.

5. The panel assembly of claim 1, wherein the panel consists of a closed-cell structure made with closed-cell beads.

6. The panel assembly of claim 5, wherein the closed-cell beads are expanded closed-cell beads.

7. The panel assembly of claim 1, wherein the drain mat is affixed to the bottom face of the panel using one of a mechanical method, a chemical method and a thermal method.

8. The panel assembly of claim 1, wherein the drain mat has a thickness that distances the bottom face from the base surface when installed thereon, and wherein the thickness of the drain mat decreases to a minimum thickness when undergoing pressure, with the drain mat remaining water-permeable at the minimum thickness.

9. The panel assembly of claim 1, wherein the panel and the drain mat are made of different materials in that the different materials have at least different mechanical characteristics.

10. The panel assembly of claim 1, wherein the panel and the drain mat form a single unit for installation over the base surface.

11. The panel assembly of claim 1, wherein the top face of the panel receives the carpet-like top layer directly without any other intermediary layer.

12. The panel assembly of claim 1, wherein the panel is made of a water-impervious material.

13. The panel assembly of claim 1, wherein the permeable base surface comprises at least one of a natural ground, dirt, gravel and sand.

14. An underlayment to be laid over a permeable base surface and under a carpet-like top layer, the underlayment comprising: a panel assembly comprising panels comprising edges and assembled together through their edges, wherein each one of the panels further comprises a top face and a bottom face with the top face of the panel facing the carpet-like top layer; a drain mat to be installed over the permeable base surface and on which are laid the bottom faces of the panels, with the drain mat operating as a fluid-permeable layer which, while in direct contact with the permeable base surface, distances the bottom face of the panels from the permeable base surface, wherein the panel assembly comprises drainage holes fluidly connecting the top face of the panel assembly to the bottom face of the panel assembly, whereby, when the panel assembly is laid over the permeable base surface, fluid drains from the top face of the panel through the drain mat and is evacuated in the permeable base surface; and wherein the drain mat comprises a combination of a top layer and a bottom layer attached to each other and providing a spacing between the bottom face and the base surface, wherein the top layer has a substantially rippled shape while the bottom layer has a substantially flat shape and both the top layer and bottom layer are water-permeable.

15. The underlayment of claim 14, wherein the edges of the panels comprise an interlocking component interlacing with the interlocking component of another one of the panels for assembly.

16. The underlayment of claim 14, further comprising draining spaces located where panels interlace with each other, with the drain mat allowing fluid to flow under the panel assembly from the draining spaces.

17. The underlayment of claim 14, wherein the permeable base surface comprises at least one of a natural ground, dirt, gravel and sand.

18. A panel assembly to be laid over a permeable base surface and under a carpet-like top layer, the panel assembly comprising: a panel comprising a top face and a bottom face, the top face of the panel facing the carpet-like top layer, wherein the panel consists of a closed-cell structure made with closed-cell beads; and a drain mat affixed to the bottom face of the panel, wherein the drain mat operates as a fluid-permeable layer which, while in direct contact with the permeable base surface, maintains a distance adapted for fluid circulation between the bottom face and the permeable base surface, whereby, when the panel assembly is laid over the permeable base surface, fluid drains from the top face of the panel through the drain mat and is evacuated in the permeable base surface; and wherein the drain mat comprises a combination of a top layer and a bottom layer attached to each other and providing a spacing between the bottom face and the base surface, wherein the top layer has a substantially rippled shape while the bottom layer has a substantially flat shape and both the top layer and bottom layer are water-permeable.

19. The panel assembly of claim 18, wherein the permeable base surface comprises at least one of a natural ground, dirt, gravel and sand.

\* \* \* \* \*